(12) United States Patent
Liao et al.

(10) Patent No.: US 7,080,908 B2
(45) Date of Patent: Jul. 25, 2006

(54) OPTICAL SYSTEM FOR PROJECTION DISPLAY APPARATUS

(75) Inventors: Chia-Chen Liao, Hsinchu (TW); Yi-Hao Kang, Hsinchu (TW); Chu-Ming Cheng, Hsinchu (TW); Keng-Han Chuang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 10/652,023

(22) Filed: Sep. 2, 2003

(65) Prior Publication Data

US 2004/0042098 A1 Mar. 4, 2004

(30) Foreign Application Priority Data

Sep. 3, 2002 (TW) ............................. 91120506 A

(51) Int. Cl.
*G03B 21/14* (2006.01)
(52) U.S. Cl. ........................................... 353/81
(58) Field of Classification Search ................. 353/33, 353/81; 348/742, 743, 771; 359/831, 833, 359/837
See application file for complete search history.

(56) References Cited

U.S. PATENT DOCUMENTS

| | | | |
|---|---|---|---|
| 5,786,934 A | 7/1998 | Chiu et al. ................. 359/494 |
| 5,829,854 A * | 11/1998 | Jones ......................... 353/33 |
| 6,461,000 B1 * | 10/2002 | Magarill ..................... 353/81 |
| 6,588,908 B1 * | 7/2003 | Shimizu ...................... 353/81 |
| 6,663,243 B1 * | 12/2003 | Fielding et al. .............. 353/31 |
| 6,666,557 B1 * | 12/2003 | Choi .......................... 353/31 |
| 6,760,168 B1 * | 7/2004 | Lee .......................... 359/834 |
| 6,908,197 B1 * | 6/2005 | Penn .......................... 353/34 |
| 2002/0021505 A1 * | 2/2002 | Lee .......................... 359/834 |
| 2005/0036118 A1 * | 2/2005 | Ishikura et al. .............. 353/81 |

FOREIGN PATENT DOCUMENTS

CN 1352404 A 6/2002

* cited by examiner

*Primary Examiner*—William C. Dowling
(74) *Attorney, Agent, or Firm*—Bacon & Thomas, PLLC

(57) ABSTRACT

The optical system of a projection display apparatus. The projection display apparatus includes a light source, a prism, a light valve, and a projection lens. A light beam emitted from the light source impinges into the prism and passes through the first surface of the prism directly to illuminate the light valve which is placed near the first surface and parallels the first surface. By the reflection of the light valve, the light beam impinges into the first surface again, and illuminates a total internal reflection surface with an incidental angle large than the critical total reflection angle, so as to reflect the light beam out of the second surface of the prism and impinge to projection lens to form an image. Therefore, the optical system can increase the transmission and decrease the number of components, and reduce its overall volume.

1 Claim, 4 Drawing Sheets

OPTICAL SYSTEM FOR PROJECTION DISPLAY APPARATUS

BACKGROUND OF THE INVENTION

1. Field of the Invention

The present invention relates to a projection display apparatus, and more particularly to an optical system for use in a projection display apparatus.

2. Description of the Related Art

For the quick development of technology, the projection display apparatus are popularly used in various fields such as for videoconferences, product display, or family theaters. To fit the commercial trend, the projection display apparatus is more lightness, thinner, smaller and more compact to lower the cost and raise the market competition.

Referring to FIG. 1, an optical system 10 is known from U.S. Pat. No. 5,552,922. Between a digital micro-mirror device (DMD) and a projection lens 12 are two adjacent and separated first prism 13 and second prism 14. By a light source 15 providing a bundle of light beam 151, the light beam 151 impinges into one surface 131 of the first prism 13 and is directed to another surface 132 with an incidental angle larger than the critical total reflection angle. By the total reflection of surface 132, the light beam 151 travels through a third surface 133, and impinge to the digital micro-mirror device 11. Then, the micro-mirror array of the digital micro-mirror device 11 re-reflects the information images light beam 152 which provides by the digital micro-mirror device 11 into the third surface 133 of the first prism 13. With an incidental angle smaller than the critical total reflection angle, the light beam 152 impinges into the surface 132, passes through the surface 132, travels into the space adjacent to the first prism 13 and the second prism 14 and, then, impinges into a surface 141 of the second prism 14. Finally, the light beam 152 passes through the surface 142 of the second prism 14, and impinges into the projection lens 12 to form the projection images.

However, in the prior art, the light beam 151 emitting from the light source 15, before impinging into the projection lens 12, needs to travel through the impinging surfaces six times (by an example of a single optical path, as shown in a dotted line.) Each time of impinging, part of the light beam is reflected to cause loss. In addition, the space between the first prism 13 and the second prism 14 makes the relative transmission angles of the information image light beam 152 excessive to lower the transmissivity and cause loss too. Therefore, the total transmissivity of the prior art reaches only about 92%. Meanwhile, referring to FIG. 2, the micro mirror 111 of the digital micro device 11 pivots on diagonal and tilts to form the ON-state or the OFF-state with different angles. As the light source 15 impinges into the digital micro device 11 with the specific direction 153, to cooperate with the diagonal pivot property of the digital micro device 111, the apparatus of the prior art arranges the diagonal line 112 of the digital micro device 11 parallel to the upper end and the lower end of the third surface 133. As a result, the superficial area of the third surface 133 is increased. Not only raise the material cost, but also increase the back-focus of other optical devices. Cause the volume of the whole optical system larger and don't fit the commercial trend for lightness, thinness, smallness and compactness.

SUMMARY OF THE INVENTION

An object of the present invention is to provide an optical system for projection display apparatus, which reduces the transmissivity loss and raises the light efficiency by means of the light beam of light source directly traveling through the prism into the light valve. Another object of the present invention is to provide an optical system for projection display apparatus, which reduces the incident times of light beam to lower the reflection loss and raise the light efficiency. Still another object of the present invention is to provide an optical system for projection display apparatus, which arranges the light valve in properly position to shrink the whole volume of the optical system.

Yet another object of the present invention is to provide an optical system for projection display apparatus, which simplifies the components of the optical system and reduces the cost.

To achieve the above objects, the present invention provides a light beam which emits from the light source to impinge into the prism and pass through the first surface of the prism directly to illuminate the light valve which is placed near the first surface and parallels the first surface. By the reflection of the light valve, the light beam impinges into the first surface again, and illuminates a total internal reflection surface with an incident angle larger than the critical total reflection angle, so as to reflect the light beam out of the second surface of the prism and impinge to projection lens to form an image. Furthermore, a lens or an auxiliary prism is arranged between the light source and total internal reflection surface to reduce the optical path difference.

BRIEF DESCRIPTION OF THE DRAWINGS

The above and other objects, advantages, and features of the present invention will be understood from the following detailed description of the invention when considered in connection with the accompanying drawings below.

DETAILED DESCRIPTION OF THE INVENTION

Figure 1:
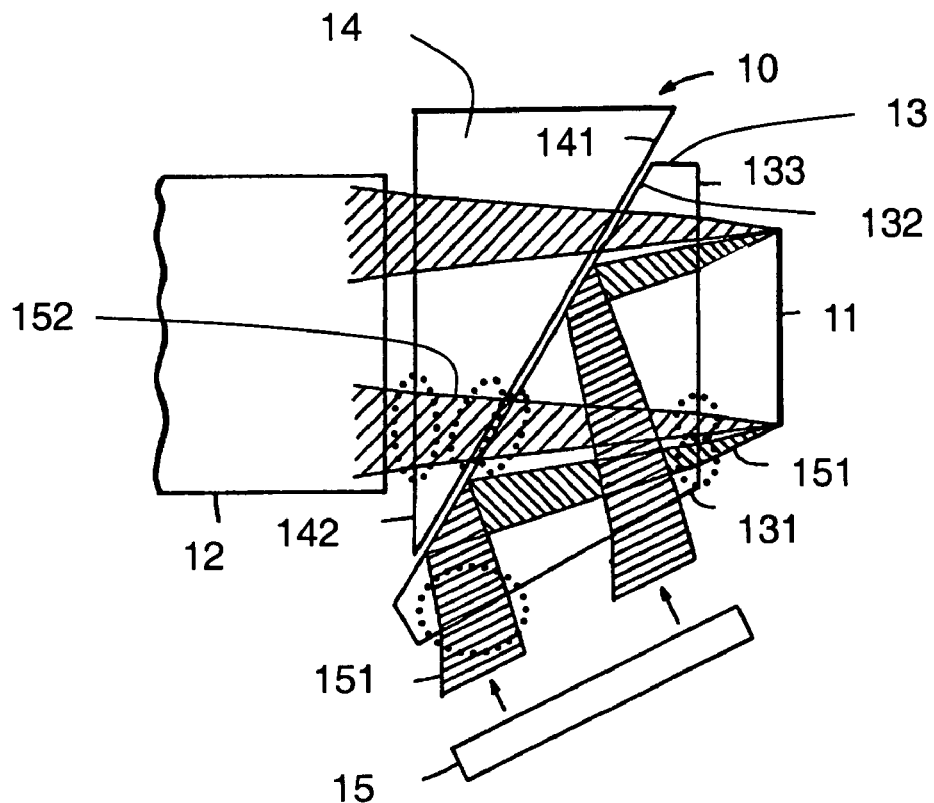
FIG. 1 is a schematic view showing an optical system of U.S. Pat. No. 5,552,922.
Figure 2:
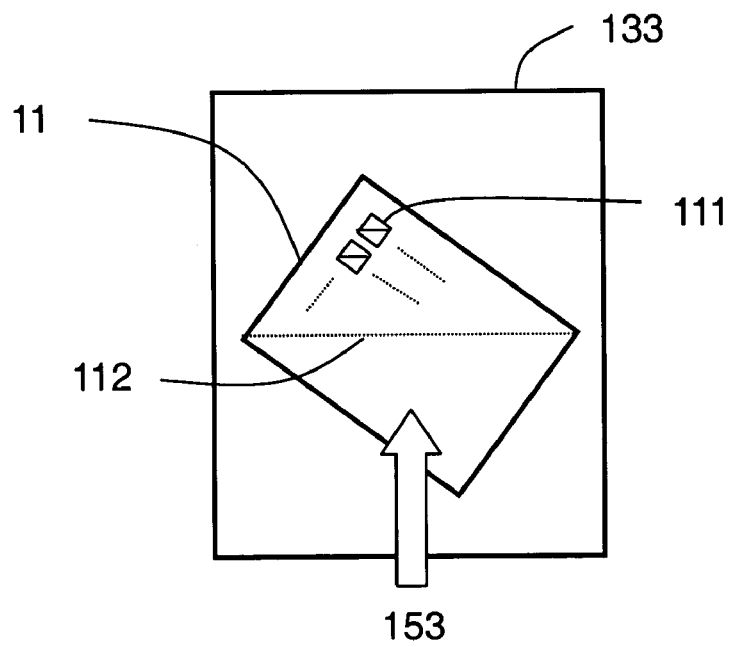
FIG. 2 is a relative position schematic view showing the light valve and the prism of the prior art.
Figure 3:
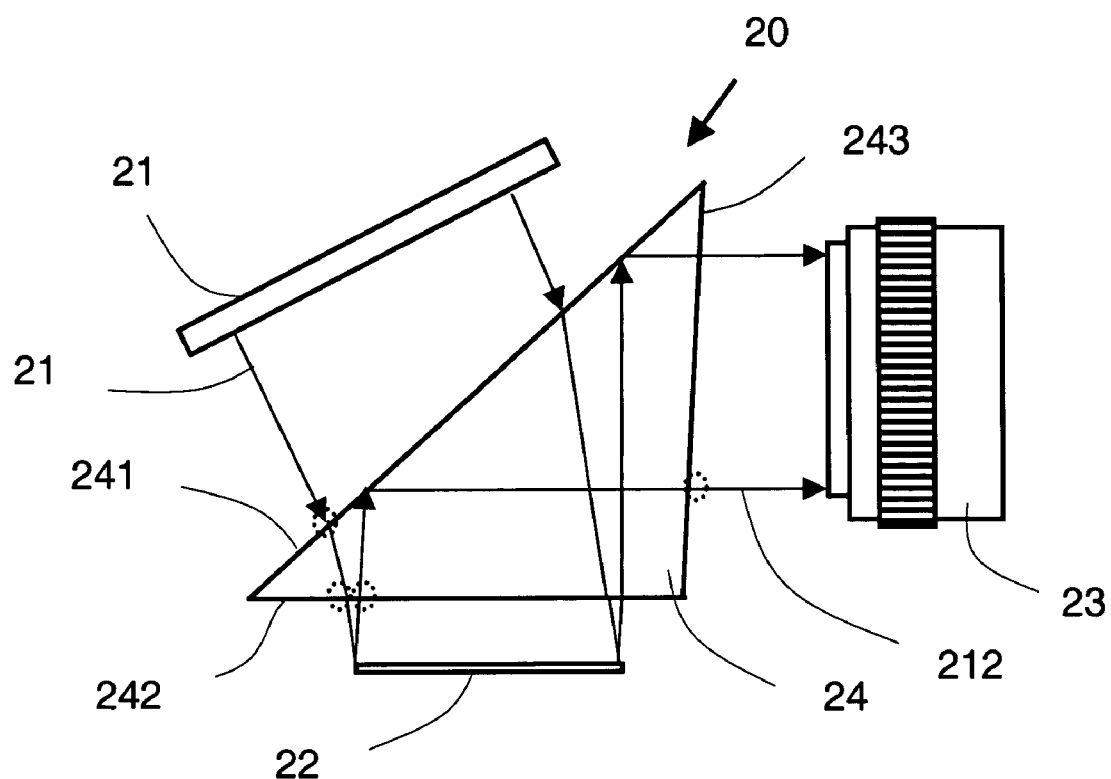
FIG. 3 is an optical path view showing the first embodiment of the present invention.

Referring to FIG. 3, an optical system 20 of a projection system of the first embodiment of the present invention has a key feature that a triangle- pillar-shaped prism 24 is arranged among a light source 21, a light valve 22 (such as a DMD or a reflective light valve) and a projection lens 23. The light source 21 is arranged adjacent to a beveled total internal reflection surface 241 which is the hypotenuse of the cross-section of the prism 24.The light valve 22 and projection lens 23 each are arranged adjacent to a first surface 242 and a second surface 243 of the prism 24 and, then, form the optical system 20.

The optical path of the optical system 20 of the present embodiment is described as below. The light source 21 provides a light beam 211. The light beam 211 impinges into the prism 24 with a specific angle, passes through the first surface 242 of the prism 24, impinges to the light valve 22 which is parallel to the first surface 242, and forms a light beam 212 with images. After being reflected by the light valve 22, the light beam 212 impinges into the first surface 242 of the prism 24 again, and impinges into the total internal surface 241 with an incidental angle larger than the critical total reflection angle. By the total reflection, the light beam 212 is reflected from the second surface 243 to the projection lens 23, and, then, forms the projection images.

In the optical system 20 of the present embodiment, the optical path from the light source 21 to the projection lens 23 is shown as dotted lines. The optical path only impinges into the total internal reflection surface 241, travels through and impinges into the first surface 242, and passes through the second surface 234, the four steps minimize portion reflection loss. Compared with the six times of portion reflection of the prior art apparatus, the light beam of the present invention loses less. In addition, the optical system 20 of the present embodiment doesn't have a vacant space, which reduces the relative transmission angles are excessive to affect the transmissivity, so the transmissivity of the present embodiment can reach about 98%.

Figure 4:
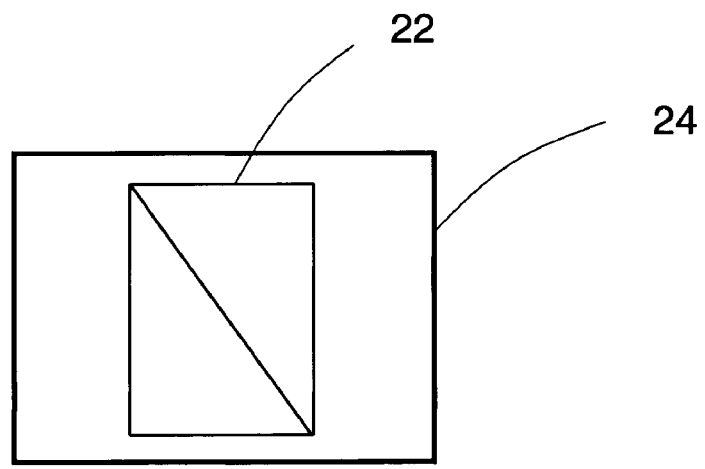
FIG. 4 is a relative position view showing the light valve and the prism of the first embodiment of the present invention.

Furthermore, referring to FIG. 4, the light source 21 of the present embodiment directly illuminates from the upper, passes through the prism 24, and impinges onto the light valve 22. Not only increase the transmissivity of the light beam 211 and raise the illumination efficiency, but allow the four edges of the light valve 22 to be parallel to the four edges of the first surface 242 to prevent the reflection light beam 212 from being intercepted by the edges of the prism 24. Then, the light beam 212 impinges onto the total internal reflection surface 241 with an incident angle larger than the critical total reflection angle, is reflected passing through the second surface 243, and finally impinges into the projection lens 23. Therefore, the size of the prism 24 can be compact and the back-focus of the optical devices can be reduced to reduce the volume of the whole optical system and, furthermore, to economize the component material cost.

Figure 5:
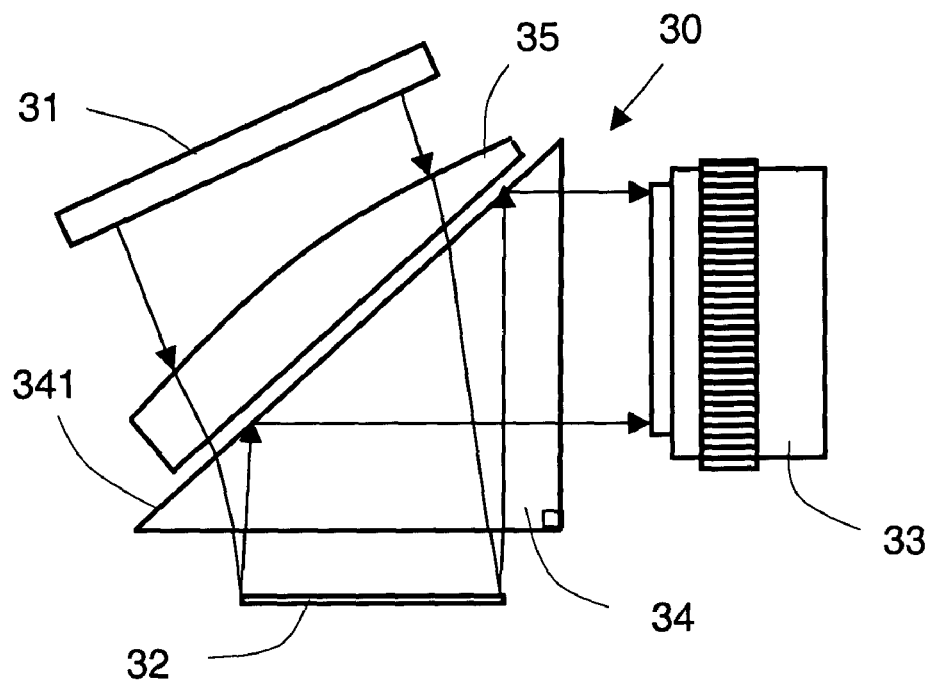
FIG. 5 is an optical path view showing the second embodiment of the present invention.

Referring to FIG. 5, an optical system 30 of the second embodiment of the present invention is shown. The construction of an optical system 30 is that a right-triangle-pillar-shaped prism 34 is arranged among a light source 31, a light valve 32 and a projection lens 33. The light source 31 is arranged adjacent to a beveled total internal reflection surface 341 which is the hypotenuse of the cross-section of the prism 34. The light valve 32 and projection lens 33 each are arranged adjacent to two other surfaces of the prism 34. Furthermore, an asymmetric lens 35 is arranged between the light source 31 and the total internal surface 341. Along the optical path of the present embodiment, a light beam, which is provided by the light source 31, passes through the straight pillar prism 34, the light valve 32, total internal surface 341, and the projection lens 33. The optical path of the present embodiment is similar to the optical path of the first embodiment. The asymmetric lens 35 of the present embodiment differs from the first embodiment. By the properties of the light with different speeds in different mediums, the asymmetric lens 35 with different thickness is used to make up for the light path difference of the two sides of the light beam from the light source 31 to the light valve 32. The light beam uniformly focuses on the light valve 32 to reduce the aberration and deformation of the projection images.

Figure 6:
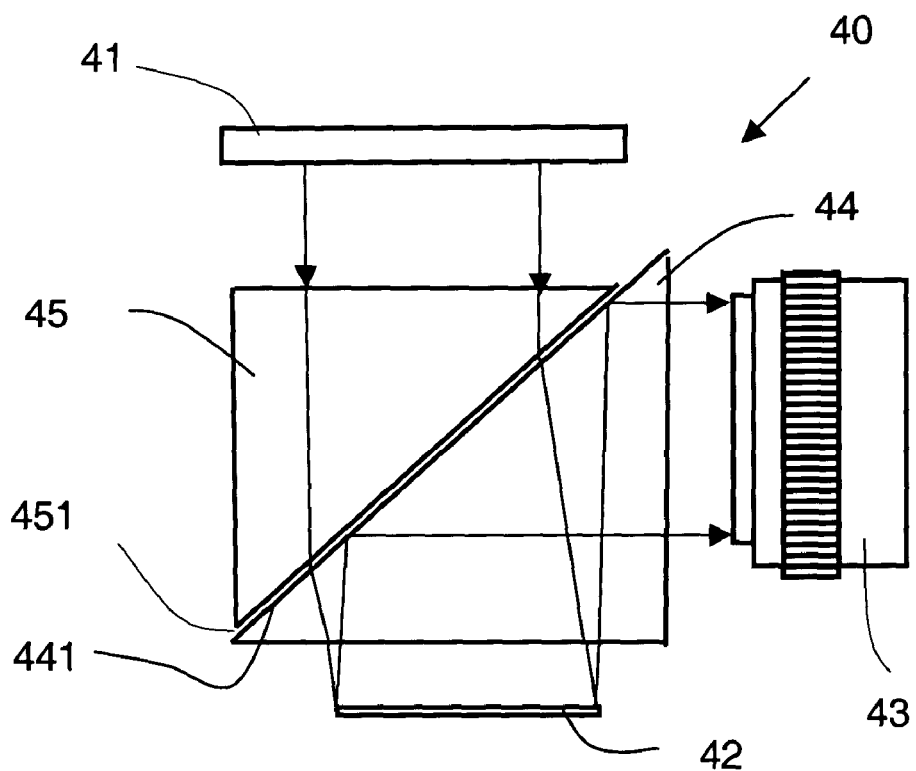
FIG. 6 is an optical path view showing the third embodiment of the present invention.
Figure 7:
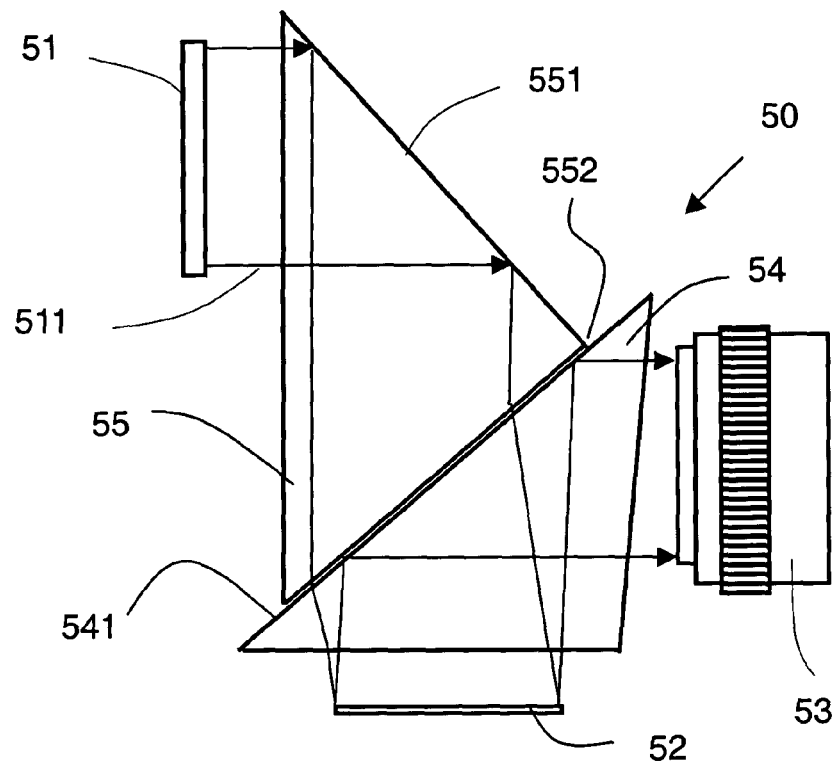
FIG. 7 is an optical path view showing the fourth embodiment of the present invention.
Figure 8:
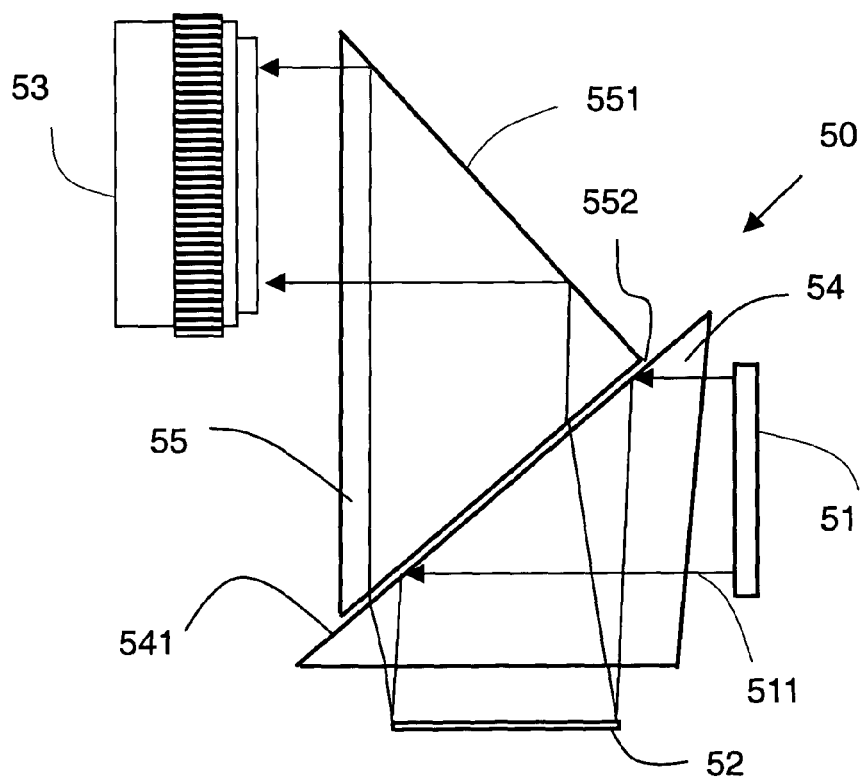
FIG. 8 is an optical path view showing contrary optical path to the fourth embodiment of the present invention.

Referring to FIG. 6, which shows an optical system 40 of the third embodiment of the present invention, the construction of the optical system 40 that a pillar prism 44 is arranged among a light source 41, a light valve 42 and a projection lens 43. The light source 41 is arranged adjacent to a total internal reflection surface 441 of the prism 44. The light valve 42 and projection lens 43 each are arranged adjacent to the two other surfaces of the pillar prism 44. Furthermore, an auxiliary prism 45 is arranged between the light source 41 and the total internal reflection surface 441. One surface of the auxiliary prism 45 is with a space 451 apart to said total internal reflection surface 441. By means of the properties of the light with different speeds in different mediums, the object of the present embodiment using the triangle-pillar-shaped auxiliary prism 45 to replace the asymmetric lens 35 of the third embodiment is to use the auxiliary prism 45 with different thickness to make up for the light path difference of the two sides of the light beam from the light source 41 to the light valve 42. Therefore, the light beam can be properly adjusted for uniformly focusing on the light valve 42 to reduce the aberration and deformation of the projection images and, meanwhile, to attain the object and efficacy that the light beam directly impinges to the light valve 42. In addition, referring to FIG. 7 an optical system 50 for the projection display apparatus of the fourth embodiment of the present invention is shown. For the relative positions of the light source 51, the light valve 52, and the projection lens 53 being changeable and the assembly of the optical system for projection display system being more flexible, the present embodiment alters the cross-section of the auxiliary prism 45 of the third embodiment. A light beam 511, which is provided by the light source 51, impinges into the auxiliary prism 55 with an incident angle larger than the critical total reflection angle and, then, reflects to a reflection surface 551, by total reflection, passes through the space 552 and the prism 54, and impinges into the light valve 52. Then, the light beam 511 is reflected to the total reflection surface 541 again, by the total reflection traveling through the prism 54, and impinges into the projection lens 53 so that the relative position of the light source 51 is changeable. As the same theorem, referring to FIG. 8, another embodiment of the present invention exchanges the positions of the projection lens 53 and the light source 51. After the light beam 511 impinging into the prism 54, reflecting by the total internal reflection surface 551 of the auxiliary prism 55 and impinging onto the light valve 52, the light beam 511 re-reflects and passes through the prism 54 and the space 552 into the auxiliary prism 55 and impinges into the reflection surface 551 of the auxiliary prism 55 with an incidental angle larger than the critical total reflection angle. Then, the light beam 511 passes through the auxiliary prism 55 by the total reflection and impinges into the projection lens 53 to project image and have the alignment more flexible.

It will be apparent to those skilled in the art that in light of the forgoing disclosure, many alternations and modifications are possible in the practice of this invention without departing from the spirit or scoop thereof. Accordingly, the scoop of the invention is to be considered in accordance with the substance defined in the following claims.

What is claimed is:

1. An optical system for a projection display apparatus, comprising:
   a light source which provides a light beam;
   a light valve which receives and reflects the light beam of said light source;
   a projection lens which is arranged in the optical path of the reflection light of said light valve;

a prism which is arranged among said light source, said light valve, and said lens, said prism having a total internal reflection surface which the light beam passes through directly to impinge onto said light valve and is reflected by said light valve to said projection lens; and a lens which is arranged between said total internal reflection surface and said light source; and wherein said lens is an asymmetric lens.

* * * * *